Sept. 7, 1954 G. A. MONTOOTH 2,688,485
BOWLING PIN SETTER
Filed March 4, 1949 8 Sheets-Sheet 1

Inventor:
George A. Montooth,

Sept. 7, 1954 G. A. MONTOOTH 2,688,485
BOWLING PIN SETTER
Filed March 4, 1949 8 Sheets-Sheet 2
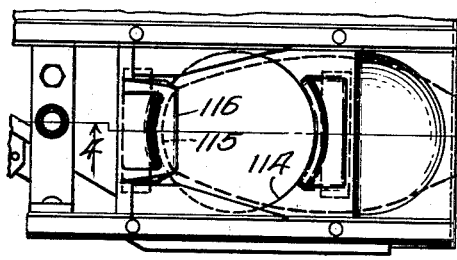
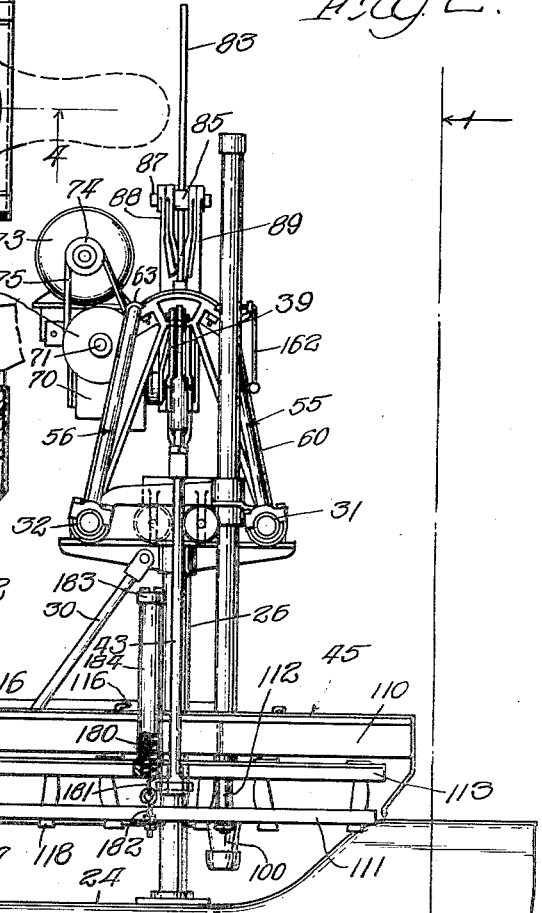
Inventor:
George A. Montooth,

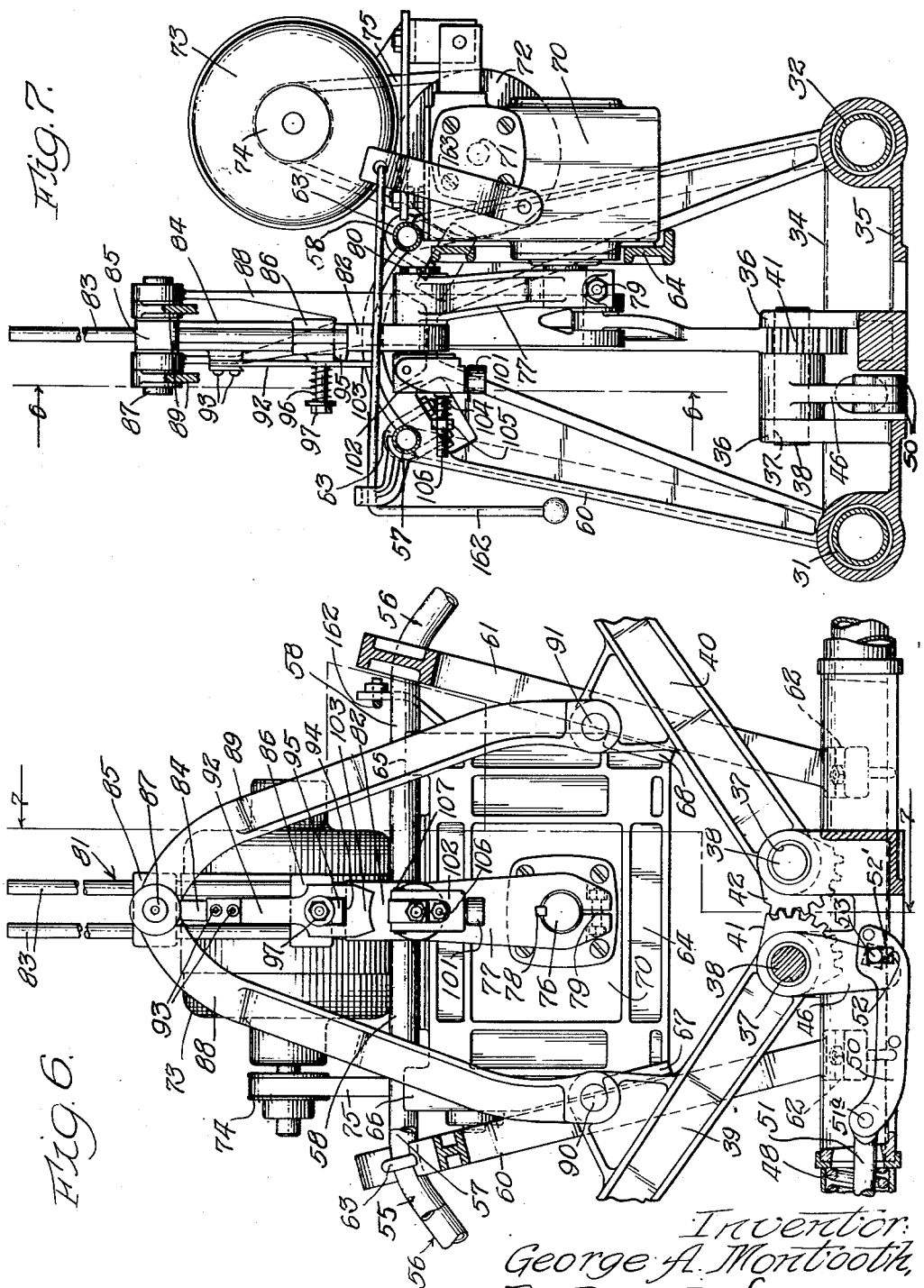

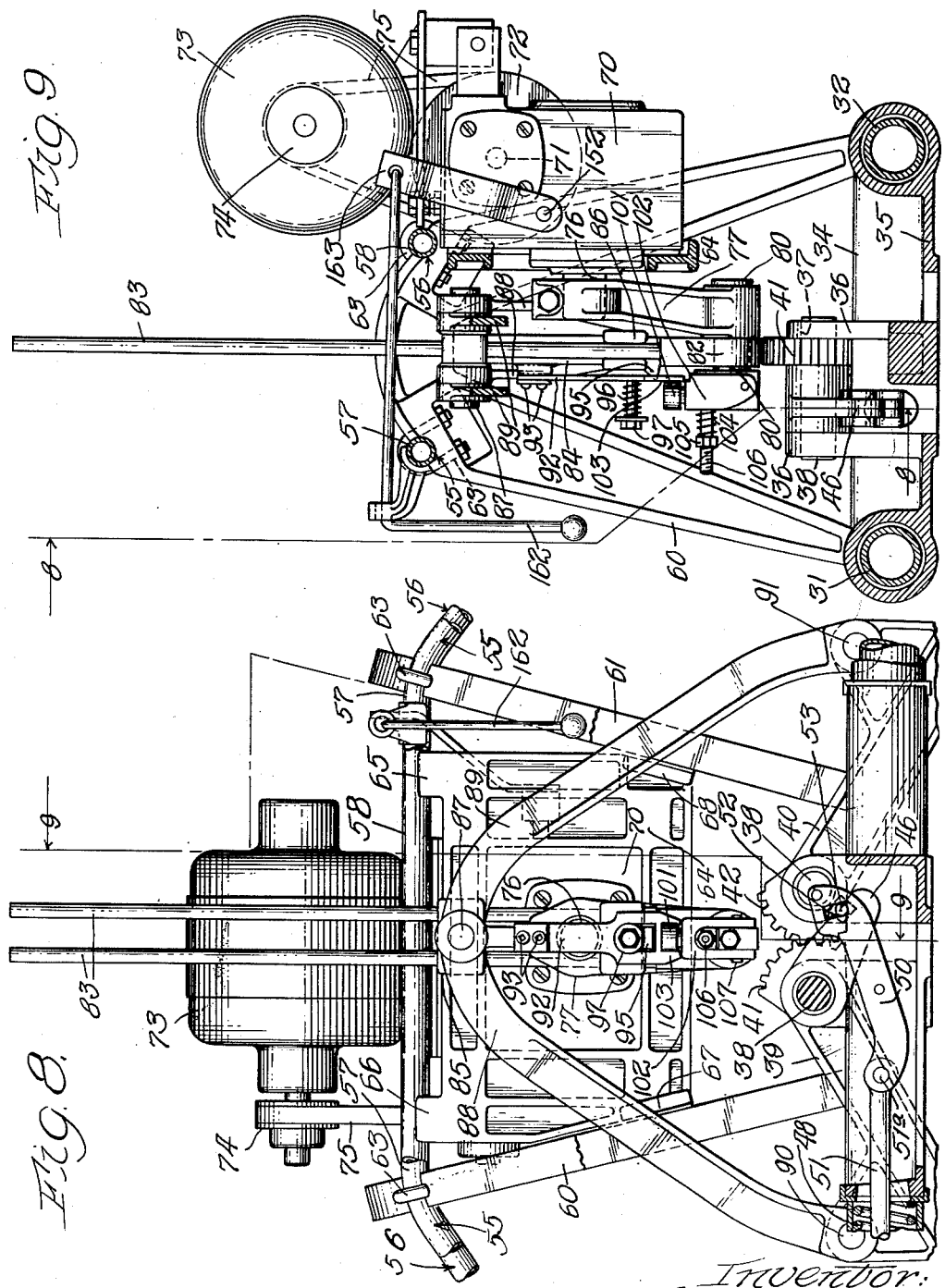

Sept. 7, 1954 G. A. MONTOOTH 2,688,485
BOWLING PIN SETTER
Filed March 4, 1949 8 Sheets-Sheet 5
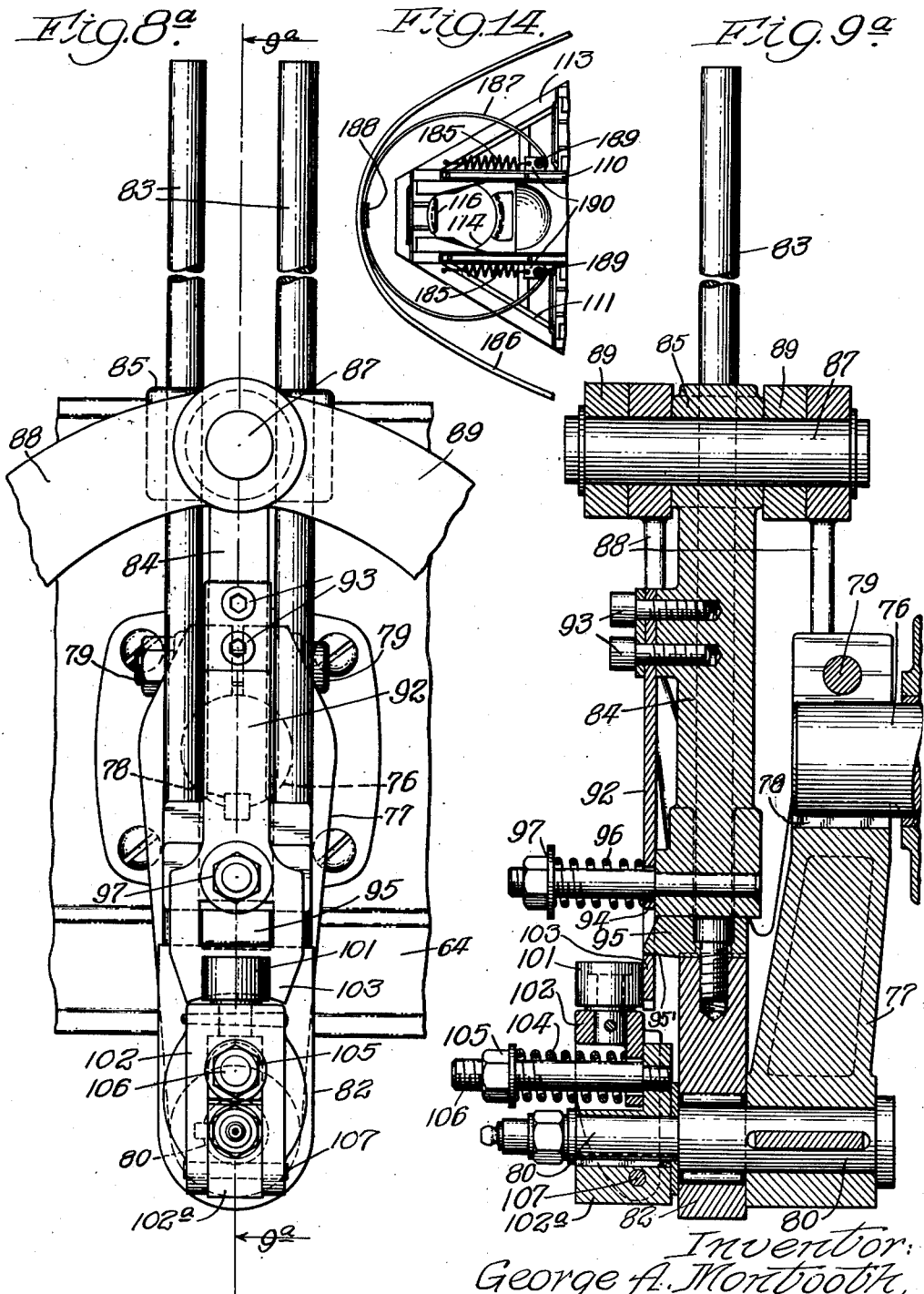
Inventor:
George A. Montooth, Sept. 7, 1954     G. A. MONTOOTH     2,688,485
BOWLING PIN SETTER
Filed March 4, 1949     8 Sheets-Sheet 6
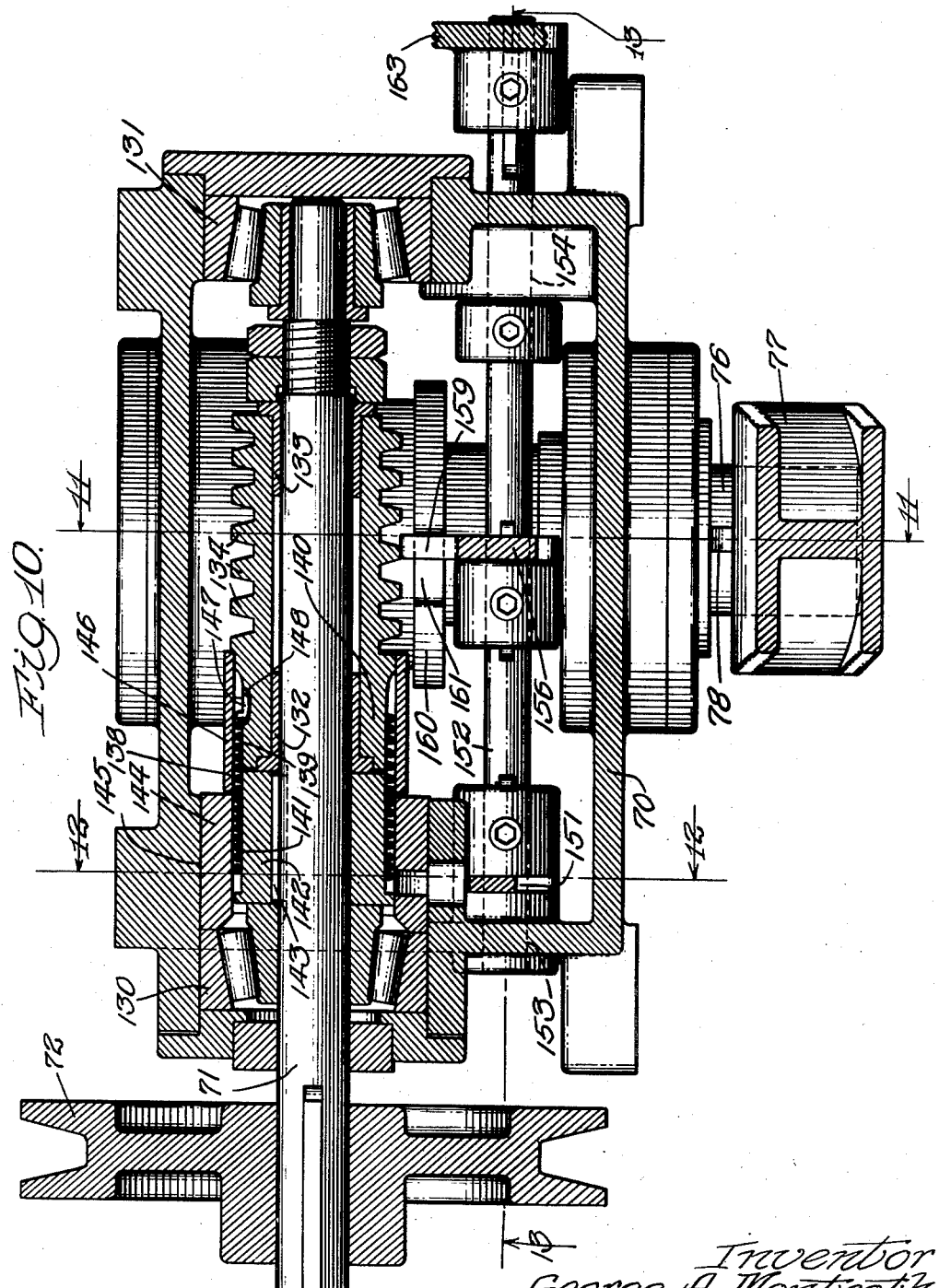

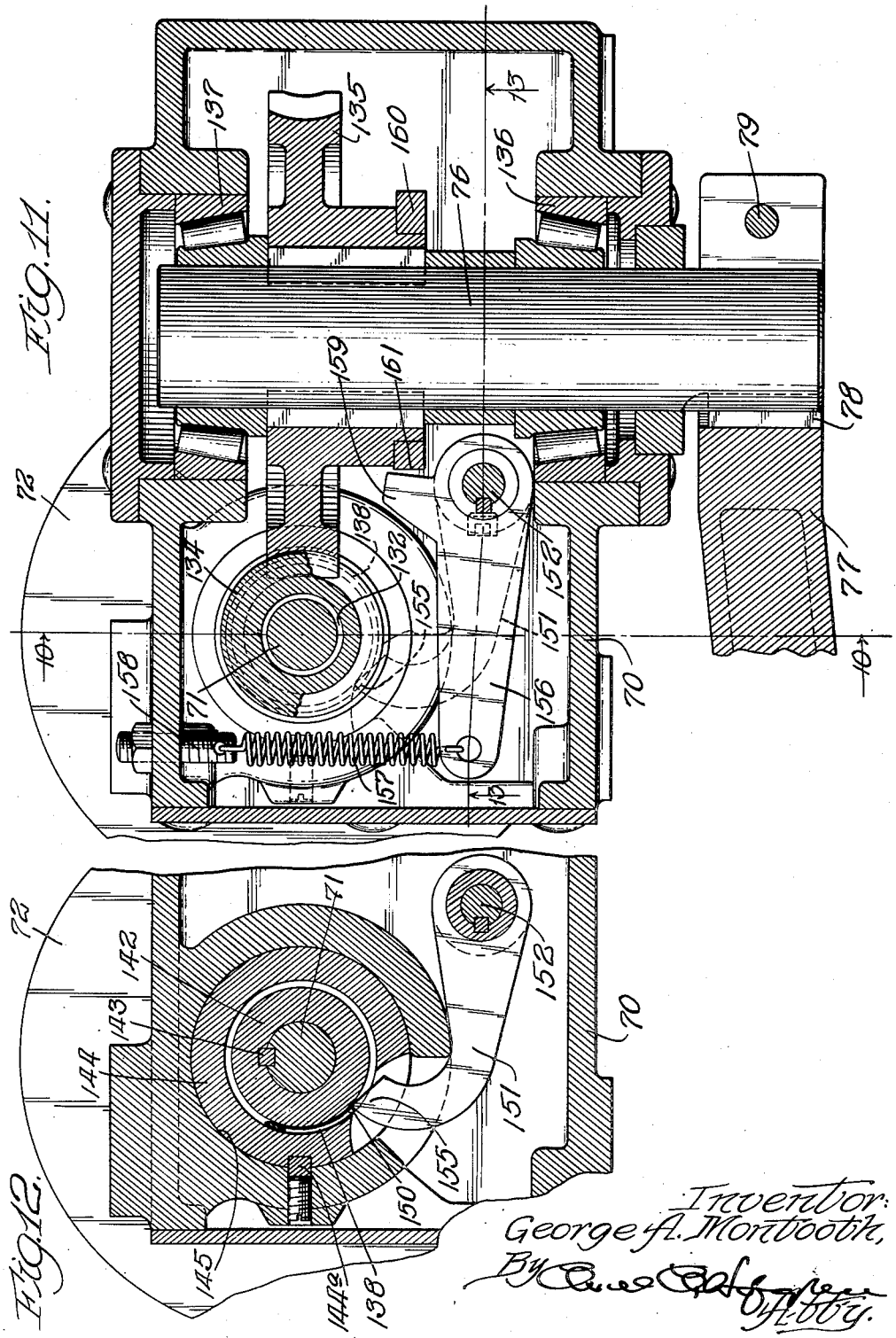

Sept. 7, 1954 G. A. MONTOOTH 2,688,485
BOWLING PIN SETTER
Filed March 4, 1949 8 Sheets-Sheet 8

Inventor:
George A. Montooth,
By
Atty.

Patented Sept. 7, 1954

2,688,485

UNITED STATES PATENT OFFICE 2,688,485

BOWLING PIN SETTER

George A. Montooth, Long Beach, Calif., assignor to The Brunswick-Balke-Collender Company, Chicago, Ill., a corporation of Delaware Application March 4, 1949, Serial No. 79,691

11 Claims. (Cl. 273—42)

The invention relates to a pinsetter that is power actuated and semi-automatic in operation.

It is the general object of the invention to provide a new and improved semi-automatic pinsetter which is motor driven and, when started by an operator, continues through a pin setting cycle of operation and stops with the pin deck in its raised or out of the way position without further attention by the operator.

Other objects of the invention are to provide a semi-automatic bowling pinsetter which may be readily installed above the pin deck of a bowling alley; which is smooth and quiet in operation; which requires a relatively small amount of power for its actuation; which embodies a gear box having a crank on its output shaft connected to actuate the pinsetter deck and arranged to rotate the crank through a single revolution when once started by an operator; which has a pinsetter deck structure mounted for vertical movement from an upper pin receiving position to a lower pin setting position and return and is counter-balanced to avoid peak loads on the driving motor; which embodies safety release mechanism which functions to interrupt the drive to the deck structure in the event the deck encounters an obstruction; which embodies a means for locking up the safety release mechanism as the deck reaches its lower or pin setting position to prevent the release mechanism from operating during the pinsetting operation; and which has a deck structure adapted to receive bowling pins in substantially a horizontal position and means for uprighting the pins and accurately setting them.

Further objects of the invention are to provide a bowling pinsetter having a power-operated drive mechanism and supporting framework therefor which is of unitary construction and may be installed as a unit on existing hand operated pinsetters and wherein the power driven mechanism may be removed and another substituted in its place.

Further objects and advantages will become readily apparent from the following detailed description taken in connection with the accompanying drawings, in which:

Fig. 2 is a side elevational view thereof along the line 2—2 of Fig. 1;

Fig. 3 is an enlarged fragmentary plan view of the pinsetter deck structure showing the pin receiving and setting parts adjacent one pin opening, and in pin receiving position.

Fig. 4 is an enlarged fragmentary vertical section taken along the lines 4—4 of Figs. 1 and 3, showing the parts in pin receiving position.

Fig. 5 is an enlarged view similar to Fig. 4 but with the parts in pin setting position.

Fig. 6 is an enlarged fragmentary rear elevational view (partly in section along line 6—6 of Fig. 7) of the drive mechanism and looking in the same direction as in Fig. 1;

Fig. 7 is an enlarged fragmentary side elevation of the drive mechanism, partly in section, along the line 7—7 of Fig. 6;

Fig. 8 is an enlarged fragmentary view (along line 8—8 of Fig. 9) similar to Fig. 6 showing the drive mechanism in the positions assumed as the pinsetter deck structure reaches its lower or pin setting position;

Fig. 8a is a fragmentary view on a still larger scale of the latch mechanism in the position shown in Fig. 8;

Fig. 9 is an enlarged elevational view along line 9—9 of Fig. 8 looking at the righthand end of Fig. 7;

Fig. 9a is a section along line 9a—9a of Fig. 8a;

Fig. 10 is a vertical section through the gear box mechanism and along the line 10—10 of Fig. 11;

Fig. 11 is a vertical section along the line 11—11 of Fig. 10;

Fig. 12 is a vertical section along the line 12—12 of Fig. 10;

Fig. 13 is a vertical section along the line 13—13 of Fig. 10 and Fig. 11.

Fig. 14 is a fragmentary plan view of the front end of the deck structure along line 14—14 of Fig. 2.

Figure 1:
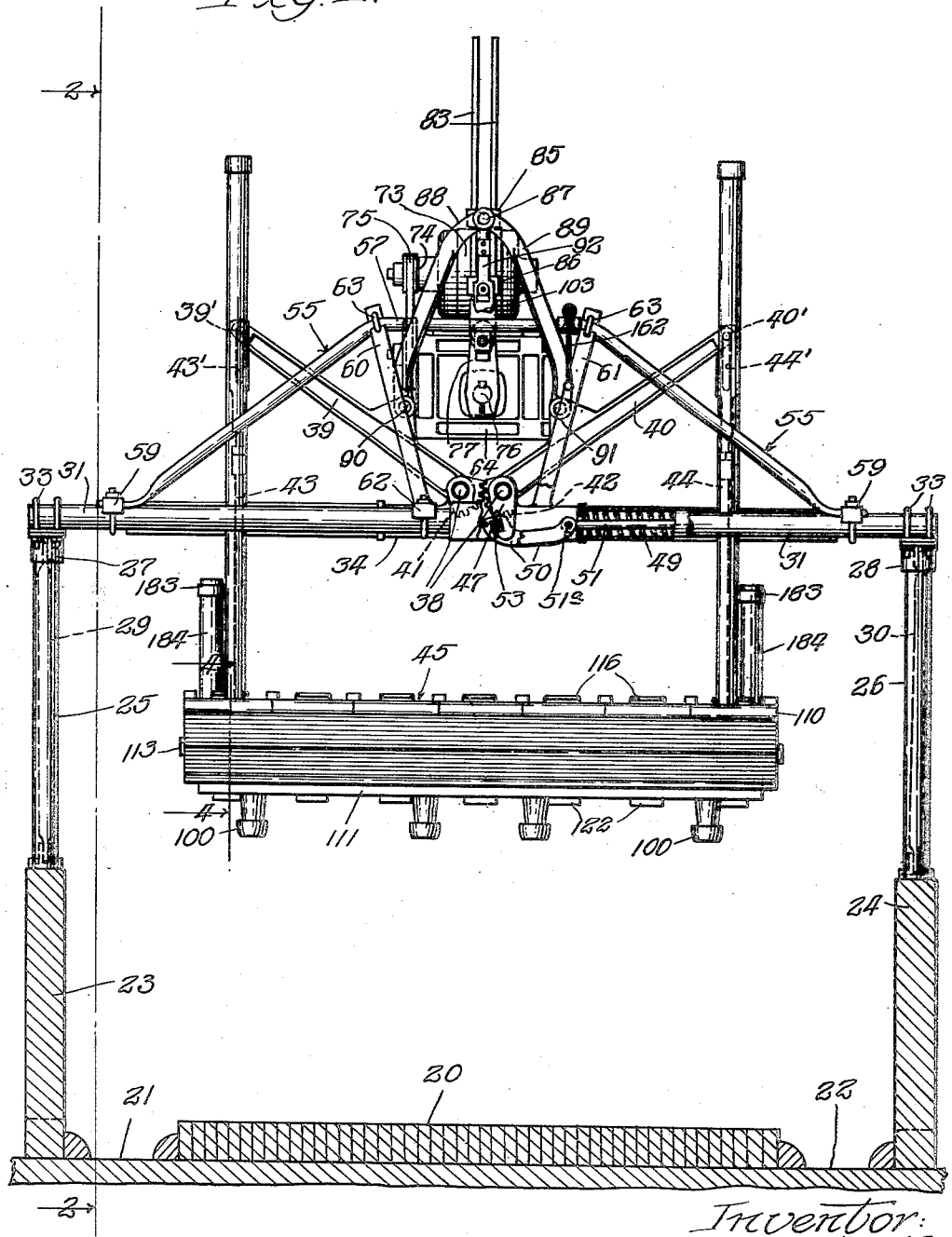
Fig. 1 is a rear elevational view of a preferred form of the invention (partly in section) installed on the kickbacks of a bowling alley and above the pin spots thereof, taken along the line 1—1 of Fig. 2.
Figure 15:
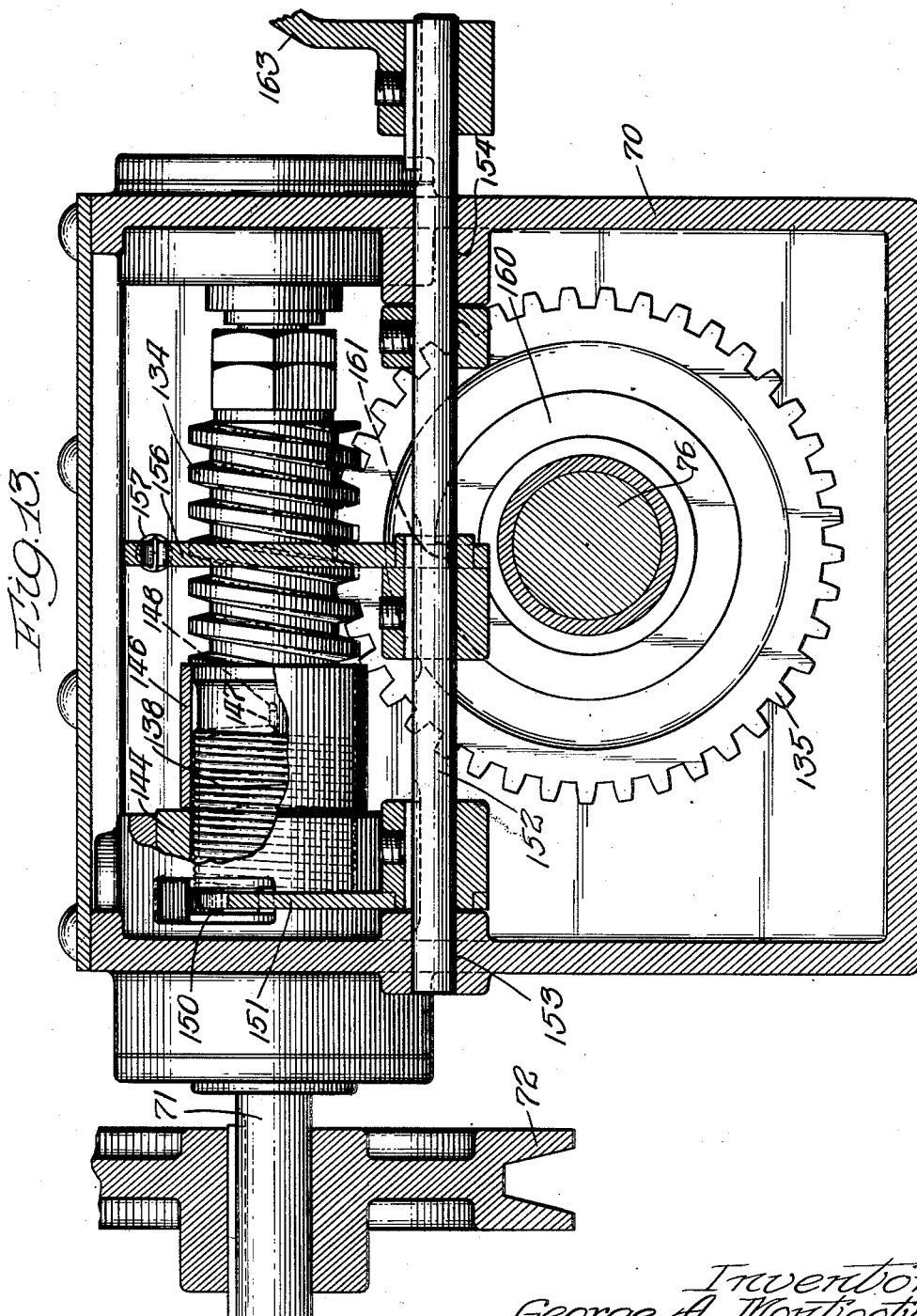

While I have illustrated in the drawings and shall herein describe in detail a preferred embodiment of the invention, it is to be understood that the invention is not limited to the particular form and arrangement shown. The scope of the invention will be pointed out in the claims.

As shown in the drawings, particularly Figs. 1 and 2, a bowling alley bed 20 is located between gutters 21 and 22 and kickbacks 23 and 24. Upstanding from the kickbacks is a supporting structure comprising vertical tubular members 25 and 26, horizontal top members 27 and 28, and inclined braces 29 and 30. A pair of parallel horizontal tubular members 31 and 32 extend between the horizontal members 27 and 28 and are secured thereto by means of U-clamps 33. Somewhat centrally of the members 31 and 32 is a casting 34 which is provided with bores through which the members 31 and 32 extend. This casting, shown more clearly in Figs. 6 to 9, has a bottom wall 35 and a plurality of lugs 36 upstanding therefrom and provided with horizontal bores 37 in which pivot pins 38 are secured. Bell crank levers 39 and 40 are rotatably mounted on the pivot pins 38 and have segmental gear portions 41 and 42, respectively, which mesh and thereby compel the bell crank levers 39 and 40 to operate simultaneously. The outer ends of the bell crank members 39 and 40 as shown in Fig. 1 are connected to the deck structure (indicated generally at 45) by vertically extending rod devices 43 and 44 which serve to hang the deck structure from pins 39' and 40' on the bell crank levers 39 and 40 and are slotted at their upper ends at 43' and 44'. Relatively short arms 46 and 47 on the bell cranks 39 and 40 are connected to compression type coil springs 48 and 49 by means of links 50 and rods 51, so that the coiled springs operate in a direction to raise the bell crank levers 39 and 40 and thereby raise the deck structure 45 and to counterbalance it. The links 50 are pivoted at one end thereof to the rods 51 by pins 51a, and at their other ends are slotted at 52 to receive a pin 53 carried on arm 46 or 47.

The drive mechanism for the pinsetter is carried on a framework adapted to be supported on the parallel tubular members 31 and 32. This framework comprises two tubular members designated generally at 55 and 56 which are bent or pre-formed as shown in Figs. 1, 6 and 8 so as respectively to have upper horizontal central portions 57 and 58 and inclined portions extending downwardly therefrom which have their ends flattened and secured to the respective horizontal tubular members 31 and 32 by means of U-clamps 59. Transversely extending brackets 60 and 61 have portions at their lower ends secured to the members 31 and 32 by U-clamps 62 and at their upper ends have recesses receiving the members 55 and 56 and clamps 63 for securing the members 55 and 56 therein. A plate 64 has recessed lugs 65 and 66 at its upper end fitting against portion 58 of the frame member 56, and has lugs 67 and 68 at its lower end fitting against the brackets 60 and 61, as shown best in Figs. 6 and 8, the lugs 67 and 68 being suitably bolted or welded to the brackets.

The plate 64 forms a support for a gear box housed in a casing 70, the casing being suitably bolted to the plate 64. This gear box, which will be hereinafter more fully described in connection with Figs. 10 to 13, has an input shaft 71 carrying a pulley 72 which is driven from an electric motor 73 by means of a pulley 74 on the motor shaft, and a connecting belt 75. An output shaft 76 carries a crank 77 which is secured to the shaft 76 by means of a key 78 and a clamping bolt 79. Crank 77 is normally inoperative in an upright position as shown in Figs. 1, 6 and 7 and is arranged, when driven, to rotate through a single revolution to lower and raise the pinsetter deck structure 45.

As shown in the drawings, and particularly Figs. 7, 9 and 9a, the free end of the crank 77 carries a pin 80 to which the lower end of a connecting rod is rotatably secured. The connecting rod comprises two relatively movable parts, one a bearing member 82 through which the pin 80 projects and which has a pair of parallel guide rods 83 secured thereto and extending upwardly therefrom. The other part is in the form of a member 84 which has upper and lower crosspieces 85 and 86 slidably engaging the guide rods 83 and at its upper end carries a pivot pin 87 which extends horizontally therefrom to receive the upper ends of links 88 and 89, the lower ends of which are pivotally connected to the bell crank levers 39 and 40 respectively by pins 90 and 91. The member 84 is normally secured to the bearing member 82 by means of a latch device consisting of a relatively thin spring latch member 92 secured to the member 84 by bolts 93, the member 92 having an aperture 94 through its lower end to receive a latch dog 95 fixed to the bearing member 82. The latch dog 95 is beveled at 95' to facilitate release of the latch member. A relatively light coiled spring 96 surrounds the shank of a bolt 97 and normally urges the latch member 92 into a position to engage the dog 95. The engaging end of the dog 95 is so beveled that in cooperation with the light spring 96 it serves to release the latch member 92 in the event the pinsetter deck structure 45 meets an obstruction during its downward movement. If the latch device is released, the crank 77 continues its movement, the guide rods 83 thus sliding downwardly through the end portions of the member 84 and leaving the links 88 and 89 in the positions in which they were at the time the deck encountered the obstruction. The latch device re-engages during the following upward movement of the member 84, after which the deck structure is raised to its normal inoperative position shown in Figs. 1 and 2 and the drive assumes the position shown in Figs. 6 and 7.

During the operation of the pinsetter a peak load on the motor is generally encountered while the pins are being up-ended from a horizontal to a vertical position and properly set on the alley 20. This occurs as the deck structure 45 reaches the bottom of its stroke. In order for a safety release device, such as that including the latch member 92, to function promptly and with certainty in the event obstructions are encountered, it is desirable to have the latch member release at less than the peak load. Since there is little likelihood of encountering any damaging obstruction after the deck structure reaches the lowered position wherein members 100 thereon engage the alley bed (which is just prior to the peak load encountered in setting the pins), the invention, in the form illustrated, embodies means for locking up the latch device during the actual pin setting (peak load) operation. This means consists of a roller 101 (Figs. 6 to 9a) which is carried on a member 102 secured to a part 102a on the free end of the crankpin 80, and an extension 103 on the latch member 92. As the crank 77 rotates from the position shown in Figs. 6 and 7 to that shown in Figs. 8 to 9a, the roller 101 engages the extension 103 and rolls over it. During the time the roller 101 rolls over the extension 103 the latch member 92 is locked in latched position, so that it cannot release. As an additional safety factor the member 102 is preferably spring loaded as by means of a coiled spring 104 positioned between a nut 105 and member 102 and surrounding a bolt 106, upon which the nut 105 is mounted, extending from the part 102a, the member 102 being pivotally supported on the part 102a by means of a crosspin 107.

The deck structure 45 is generally of the type disclosed in United States Letters Patent No. 1,626,446 to J. W. Bishop, dated April 26, 1927.

It comprises an upper horizontal frame 110 and a lower frame 111 secured together in rigid but vertically spaced relation by a plurality of bolts 112. These frames have suitable openings therethrough, ten in number, located at the proper positions for the ten pins which are to be set on the alley bed. An intermediate frame 113 is carried on the lower ends of the rods 43 and 44 so that when the pinsetter deck structure is in its raised position, the upper and lower frames hang from the intermediate frame 113. The intermediate frame also has openings located in accordance with the ten pin positions, and at each such opening carries a member 114 which surrounds the pin opening and has an upstanding portion 115 against which the bottom of the pin engages when the pin lies horizontally on the top frame. A lip 116 on the portion 115 overlies the adjacent bottom end of the pin when it is positioned as in Fig. 4. Front and rear locating shoes 117 and 118 are carried on the intermediate frame 113 on pivot pins 119 and 120. The rear surfaces 121 and 122, respectively, of said shoes engage against cam edges 123 and 124 on the bottom frame 111, so that as the intermediate frame moves downwardly relatively to the bottom frame, the shoes for each pin are moved towards each other to receive and set a pin. As the deck structure moves downwardly, bumper posts 100 which extend below the bottom frame, engage the alley bed 20 and the top and bottom frames of the deck structure are arrested in their movement. Up to this time the pins have remained in their substantially horizontal positions, but as the intermediate frame continues to move downwardly, the lips 116 engage the bottom ends of the pins and pull them into a more upright position, from which they drop down into the space between the shoes 117 and 118, the shoes in the meantime having been moved together to their pin setting positions. For a full disclosure of the apparatus and operation above described, together with claims to certain novel features thereof, reference is had to the co-pending application of Robert I. Anderson filed April 14, 1949 as Serial No. 87,542. This application has matured into U. S. Letters Patent No. 2,634,978, granted April 14, 1953. The intermediate frame moves downwardly until the crank 77 of the drive mechanism passes through its lowermost position, at which time the pins are accurately set on the alley. As the crank 77 continues in its rotation, the intermediate frame is again released relatively to the top and bottom frames, during which movement the shoes 117 and 118 spread apart, due to their own weight, to positions wherein they pass the standing pins without disturbing them. After the intermediate frame engages the top frame the entire deck structure rises to the position shown in Figs. 1 and 2 as the crank 77 returns to its inoperative position.

The drive mechanism for the deck structure includes the gear box referred to hereinbefore as having a casing 70. Its construction will now be described in more detail with reference to Figs. 10 to 13.

As illustrated herein the input shaft 71 is rotatably supported in anti-friction bearings 130 and 131. Loosely supported on the shaft by means of bushings 132 and 133 is a worm 134. This worm meshes with a worm wheel 135 which is keyed to the output shaft 76 which is rotatably supported in the casing by anti-friction bearings 136 and 137 on an axis transverse to that of the shaft 71. The outer end of the shaft 76 carries the crank 77 which is periodically given a single rotation by engagement of clutch mechanism which comprises a coiled clutch spring 138, a portion of which circumscribes a cylindrical clutch face 139 on an extension 140 on the worm 134 and the remainder of which circumscribes a cylindrical clutch face 141 on an annular bushing 142 which is secured to the shaft 71 as by a key 143. Externally the spring is surrounded in part by annular member 144 fixed in a bore 145 in the casing 70 (by a key 144a (Fig. 12)) and in part by a tubular member 146 fixed to and rotatable with the worm. One end 147 of the clutch spring 138 is bent radially inward and then turned at right angles to the coil and anchored in a slot 148 cut in the adjacent portion of the worm (Figs. 10, 11 and 13). The clutch spring 138 is normally coiled so as to wrap around and engage the clutch surfaces 139 and 141 of the worm portion 140 and the bushing 142 respectively, and thereby form a clutch between said parts which causes the worm to rotate with the shaft 71. It is possible to release the clutch by stopping rotation of the opposite end 150 of the clutch spring (Figs. 12 and 13), thus causing the spring to unwind from driving contact with the parts 140 and 142. A braking action for the worm is obtained by the expansion of the spring into engagement with the interior of the parts 144 and 146, due to the inertia of the worm and parts driven thereby.

Generally, it is desirable to have the clutch normally disengaged so that the motor 73 may remain in operation. To accomplish this, a control arm 151 is secured to a horizontally extending control shaft 152 which is rotatably journalled in the end walls of the casing 70 in bores 153 and 154. The arm 151 has an upwardly extending portion 155 which is normally positioned in the path of the end 150 of the clutch spring to unwrap it from the parts 140 and 142. The control shaft 152 carries a second arm 156 and a coiled spring 157 is connected intermediate the free end of the arm 156 and an adjustable screw device 158 supported in the casing wall to maintain the arm 151 in the position shown in Figs. 11 and 12.

The arm 156 has a projecting portion 159 (Figs. 10 and 11) which is engageable by a cam 160 secured to the worm wheel 135. As shown best in Fig. 13, this cam is generally circular with the exception of a notch at 161 into which the projection 159 extends when the portion 155 of the arm 151 engages the clutch spring end 150 to disengage the clutch.

As the control shaft 152 is rocked in a counterclockwise direction as illustrated in Figs. 7, 9 and 11, as by pulling on a cord 162 connected to an arm 163 on the outer end of the control shaft, and with the shaft 71 rotating in a counterclockwise direction, the portion 155 of the arm 151 is momentarily withdrawn from its position in front of the end 150 of the clutch spring. Due to its normal tendency to contract, the clutch spring then engages the parts 140 and 142 and drives the worm 134 with the shaft 71. As soon as the worm rotates sufficiently to rotate the cam 160 in a clockwise direction, as shown in Fig. 13, sufficiently to move the circular periphery of the cam under the projection 159 of arm 156, the cam 160 serves to maintain the arm portion 155 out of engagement with the end 150 of the clutch spring. The clutch then remains engaged until the crankshaft 76 has completed one revolution whereupon the projection 159 re-enters the notch 161 in the cam 160 and permits the spring 157 to rotate the control shaft 152 in a clockwise direction as shown in Figs. 11 and 12, to position the arm portion 155 in the path of the rotating end 150 of the clutch spring. The end 150 of the arm 138 is therefore stopped the next time it comes around and the clutch spring is released to disengage the clutch and apply the brake. This subject matter is disclosed and claimed in my divisional application filed February 10, 1950 as Serial No. 143,469. This application has matured into U. S. Letters Patent No. 2,652,134, granted September 15, 1933.

If, during the first half of the revolution of the crank 77 during which the deck structure 45 is being lowered to the pin setting position, the deck structure encounters an obstacle, the latch member 92 releases substantially instantaneously against the pressure of the relatively light spring 96. In such case, the crank continues its rotation, the deck structure remaining in the partly lowered position until the crank has moved sufficiently through the second half of its stroke whereupon the latch member 92 re-engages the dog 95 and the deck structure is returned to its loading position. In the event no obstruction is encountered, the deck structure descends until the members 100 engage the alley bed, after which the intermediate frame 113 of the deck structure continues its downward movement to up-end the pins and to move the shoes 117, 118 together to locate the pins on the alley bed. After the pins are set, the intermediate frame 113 moves upwardly ahead of the top and bottom frames 110 and 111, thus permitting the shoes to separate and pass by the pins without touching them during the return upward movement of the deck structure.

While the deck structure frames 110 and 111 are resting upon the alley bed, the means for locking the latch device is effective, the roller 101 then rolling over the lower end 103 of the latch member 92 as shown in Fig. 9a. If an obstruction to operation of the deck structure is encountered while the roller 101 rolls over the extension 103 on the latch member, the spring 104 may yield to permit the latch member to release the dog 95.

The slots 43' and 44' in the upper ends of the rod devices 43 and 44 which serve to hang the deck structure on the bell crank levers (Fig. 1) serve a double purpose. Generally, the arms 39 and 40 and the actuating mechanism therefor are so designed and proportioned that after the members 100 on the deck structure engage the alley bed, the pins 39' and 40' carried on the bell crank levers 39 and 40 descend in the slots 43' and 44', a pre-selected distance, as for example, one-third the length of the slots. While the pins 39' and 40' are descending in said slots, the deck structure dwells after the intermediate frame 113 has moved downwardly relatively to the frames 110 and 111 to set pins. This dwell is useful to permit the pins to reach a stable condition on the alley bed in the event they are not immediately placed squarely thereon by the up-ending and locating operations. Although with brand new pins having flat bottoms the pins generally assume stable condition immediately upon setting, when the machine is used with older pins having somewhat rounded bottoms a slight delay or dwell of the intermediate frame in its pin setting position is desirable. The other purpose of the lost motion connections provided by the pins 39', 40', and slots 43', 44', respectively, is to provide additional safety in the event an obstruction is encountered by the deck structure when the latch member 92 is locked to the dog 95. If the deck structure is in its lowered position and an obstruction prevents the intermediate deck 113 from descending relatively to the lower deck 111, the pins 39', 40' can descend in the slots.

The coil springs 48 and 49 are normally adjusted so that they do not completely counterbalance the deck structure with the result that the deck structure hangs on the pins 39' and 40' and during the descent of the bell crank arms 39, 40, the weight of the deck structure keeps the pins at the upper ends of the slots 43', 44', respectively. This is especially true when the deck structure is loaded with a set of pins. When the deck structure, during a pin setting operation, reaches the alley bed, the movement of the intermediate frame 113 downwardly relatively to the bottom frame 111 produces the peak load on the motor as more power is needed to overcome springs 48 and 49 since the deck structure is resting on the alley bed, this occurring while the pins are being up-ended and located on the alley bed. A pair of springs 180 is provided with their lower ends 181 anchored to the bottom frame 111 by eye bolts 182 and their upper ends anchored to cap members 183 secured to tubes 184 extending upwardly from the intermediate frame 113 as shown best in Fig. 2. These spring devices are located at opposite sides of the deck structure as indicated in Fig. 1 and are tensioned to bias or pull the intermediate frame 113 downwardly with respect to the lower frame 111. As the springs are not positioned exactly opposite the center of gravity of the lower frame and the parts connected thereto (as viewed in Fig. 2, the springs 180 are slightly to the right of the center of gravity of the frames 110, 111), a pair of small coil springs 185 is preferably connected between the upper frame 110 and the intermediate frame 113 as shown best in Figs. 2 and 14 to effect a balance between the frames.

In the form illustrated, and as shown in Figs. 2 and 14, the deck structure is provided with a guard to ward off bowling balls which reach the pin setter location while the deck structure is in its lowered position. This guard consists of a somewhat U-shaped member 186 of plywood or other suitable material extending along the front of and along the sides of the deck structure and suitably secured thereto adjacent its rear ends. The front end of the member 186 is supported on the deck structure by means of a somewhat circular spring 187 fastened to the member 186 by a clip 188. The rear ends of the spring 187 are formed with loops which surround pins 189 carried on brackets 190 on the upper frame 110. The spring 187 is adapted to yield in all directions from which a ball may strike the deck structure, the member 186 during any such yielding of the spring being sufficiently flexible to bend or bulge as may be required. This subject matter is disclosed and claimed in my co-pending application filed May 31, 1950 as Serial No. 165,130.

In the operation of the pin setter the force exerted by the springs 48 and 49 is considerable due to the short arms 46 and 47 to which they are connected and the long arms 39 and 40 which support the deck structure. In order to avoid excessive wear between the arms 46 and 47 and their connecting links 50, the links are provided with rectangular slots 52 as shown in Figs. 1, 6 and 8, and the pins 53 are carried non-rotatably on the arms 46 and 47. During the movement of the arms from the position shown in Fig. 6 to the position shown in Fig. 8, the pins 53 roll on the adjacent surfaces 52' of the slots, from one end of the slot to the other end without friction, thereby producing a connection having long life. The links 50 are made up of spaced members which straddle the arms 46 and 47 as shown in Figs. 7 and 9, the ends of the pins projecting forwardly and rearwardly from the arms to engage both parts of the link.

I claim:

1. In a bowling pinsetter having a deck structure provided with pin receiving and setting means thereon, a supporting structure therefor including means for guiding the deck structure for vertical lowering and return movements, and means for counterbalancing said deck structure including a pair of pivotally supported arms having their free ends connected to said deck structure by links and springs operatively connected to the arms for urging their free ends upwardly, in combination, a rotatably mounted crank, means for driving said crank including a motor and a clutch, means for connecting said crank to said arms comprising a connecting rod pivotally connected at one end to a pin on said crank, a pair of links connecting the other end of said rod to said arms, said connecting rod comprising a pair of relatively movable parts, a latch device normally connecting said parts together to maintain a driving connection to the deck structure and yieldable to interrupt the driving connection in the event the pinsetter deck meets an obstruction, said latch device automatically re-engaging during the remainder of the revolution of the crank.

2. In a bowling pinsetter having a deck structure provided with pin receiving and setting means thereon, a frame having means for guiding the deck structure for vertical up and down movements, and means for movably supporting said deck structure on said frame including a pair of pivoted arms having their outer ends connected to the deck structure by rods and springs operatively connected to said arms for urging their outer ends upwardly to substantially counterbalance the weight of said deck structure, in combination, a rotatably mounted shaft, means for driving said shaft, means for lowering and raising said deck structure including a motion transmitting device on said shaft and a connecting member operated thereby and comprising a pair of relatively movable parts, a pair of links connecting one of said parts to said arms, a latch device normally connecting said parts together and having a member yieldable to interrupt the driving connection in the event the pinsetter deck structure meets an obstruction, and a lockup for said latch device operable as the deck structure moves through its setting position to prevent release of the latch device, said lockup including a roller carried on the motion transmitting device in a position to roll over the latch device member and prevent it from unlatching.

3. In a bowling pinsetter having a deck structure provided with pin receiving and setting means thereon, a frame having means for guiding the deck structure for vertical up and down movements, and means for movably supporting said deck structure on said frame including a pair of pivoted arms having their outer ends connected to the deck structure by rods and springs operatively connected to said arms for urging their outer ends upwardly to substantially counterbalance the weight of said deck structure, in combination, a rotatably mounted shaft, means for driving said shaft, means for lowering and raising said deck structure including a motion transmitting device on said shaft and a connecting member operated thereby and comprising a pair of relatively movable parts, links extending between said connecting member and said arms, a pair of parallel guide rods extending substantially radially from one of said parts and slidably through bores in the other part, a device normally connecting said parts together and yieldable to permit them to separate to interrupt the driving connection in the event the pinsetter deck structure meets an obstruction, and means operable as the deck structure moves through its setting position to prevent movement between the parts of the motion transmitting device.

4. In combinaion with a bowling pinsetter having a deck structure adapted to receive bowling pins when in a raised position and to set them when in a lowered position, a supporting structure having means for guiding the deck structure vertically from its raised to its lowered position and return during a setting operation and counterbalancing means for said deck structure including a pair of bell cranks having the ends of their adjacent arms intergeared to cause equal and opposite movement of the bell cranks and their other arms upwardly and outwardly diverging with the ends thereof connected to said deck structure by a pair of rods, said supporting structure including a pair of parallel horizontally extending tubular members, a power drive unit comprising a frame having additional preformed tubular members adapted to be clamped to said parallel tubular members and extending upwardly therefrom, a gear box supported on said frame and having input and output shafts, said output shaft being positioned above the intergeared ends of said bell cranks, a motor supported on said frame and connected to drive said input shaft, a crank on said output shaft, said gear box including a clutch device operable when engaged to rotate said crank, means operable upon completion of a single rotation of the crank to disengage the clutch device, and means for connecting said crank to said other arms to lower and raise the deck during a single revolution of the crank including a connecting rod having one end connected to said crank and the other end positioned above and in line with said output shaft and intergeared ends of the bell cranks, and a pair of downwardly diverging links having their upper ends pivotally connected together and to the other end of said connecting rod and their other ends connected to said other arms of the bell cranks.

5. A bowling pinsetter having a deck structure provided with pin receiving and setting means thereon, a supporting structure therefor including means for guiding the deck structure for vertical lowering and return movements, a pair of pivotally supported arms on said supporting structure geared together at their pivots and having their free ends extending divergently, a pair of links connected at their lower ends to said deck structure and at their upper ends having slots receiving pins on said arms to form lost motion connections therebetween and means for actuating said arms to lower and raise the deck structure during a pin setting operation comprising a rotatably mounted crank, means for driving said crank and means connecting said crank to said arms.

6. In a bowling pin setter having a deck structure provided with pin receiving and setting means thereon, a supporting structure including a pair of horizontally spaced tubular members extending laterally of and above the alley bed, mechanism on said members for guiding the deck structure for vertical up and down movements, and means for counter-balancing said deck structure including a pair of intergeared bell cranks having their outer ends connected to said deck structure by a pair of rods, in combination, a detachable drive mechanism including a power unit for controlling the movement of said deck structure comprising, a pair of upwardly extending horizontally spaced bent tubular arms attached at their ends to said tubular members adjacent their ends, a pair of reinforcing brackets extending substantially vertically between said tubular members and said tubular arms, means for attaching said brackets to said members and arms, a mounting plate for said power unit extending between the brackets in a vertical plane passing through one of said tubular arms and secured to said brackets and in engagement with said one tubular arm, means for operatively connecting said power unit to said deck structure including a crank driven by said power unit, a connecting rod pivotally connected at one end to said crank, a pair of links connecting the other end of said rod to said bell cranks, said connecting rod comprising a pair of relatively movable parts, a pair of parallel guide rods extending substantially radially from one of said parts and slidable through bores in the other part, a flexible spring normally connecting said parts together and yieldable to interrupt the driving connection in the event the pin setter deck structure meets an obstruction, and a lockup for said spring operable when the deck structure moves through its setting position to prevent yielding thereof, said lockup including a roller carried on the crank in a position to roll over the spring and prevent it from yielding.

7. In a bowling pin setter having a deck structure provided with pin receiving and setting means thereon, a supporting structure including a pair of horizontally spaced tubular members extending laterally of the alley bed, means on said members for guiding the deck structure for vertical up and down movements, and means for counterbalancing said deck structure including a pair of pivotally supported arms having their outer ends connected to said deck structure by a pair of rods, said arms extending in diverging directions, in combination, a detachable drive mechanism including a power unit for controlling the movement of said deck structure comprising, a pair of upwardly extending horizontally spaced bent tubular arms attached at their ends to said tubular members adjacent their ends, a pair of reinforcing brackets extending vertically between and in planes normal to the length of said tubular members and said tubular arms and having means for attachment thereto, a vertically disposed mounting plate for said power unit extending between the brackets and in engagement with one of said tubular arms and secured to said brackets, means for operatively connecting said power unit to said deck structure including a crank driven by said power unit, a connecting rod pivotally connected at one end to said crank, a pair of links connecting the other end of said rod to said diverging arms, said connecting rod comprising a pair of relatively movable parts, a latch device normally connecting said parts together and having a member yieldable to interrupt the driving connection in the event the pin setter deck structure meets an obstruction, and a lockup for said latch device operable when the deck structure moves through its setting position to prevent release of the latch device, said lockup including a roller carried on the crank in a position to roll over the latch device member and prevent it from yielding and unlatching.

8. In a bowling pin setter having a deck structure provided with pin receiving and setting means thereon, a supporting structure including a pair of tubular members extending laterally of the alley bed, means on said members for guiding the deck structure for vertical up and down movements, and means for counterbalancing said deck structure including a pair of pivotally supported arms having their outer ends connected to said deck structure by a pair of rods, in combination, a detachable drive mechanism including a power unit operatively connected to said deck structure comprising, a pair of upwardly extending bent tubular arms attached at their ends to said tubular members adjacent their ends, a pair of brackets extending between said tubular members and said tubular arms and normal to the length of said members and arms, means for attaching said brackets to said member and arms, and a mounting plate for said power unit extending between and secured to said brackets and lying in a vertical plane including one of said tubular arms, said power unit including a one-revolution clutch and a gear reduction unit for driving an output crank, and means for operatively connecting said crank to said deck structure including a connecting rod, said connecting rod comprising two relatively movable parts, a latch device normally connecting said parts together and having a member yieldable to interrupt the driving connection in the event the pinsetter deck structure meets an obstruction, and a lockup for said latch device to prevent release of the latch device when the deck structure moves through its setting position.

9. In a bowling pin setter having a deck structure provided with pin receiving and setting means thereon, a supporting structure including a pair of horizontally spaced tubular members extending laterally of the alley bed, means on said members for guiding the deck structure for vertical up and down movements, and means for counterbalancing said deck structure including a pair of pivotally supported arms having their outer ends connected to said deck structure by a pair of rods, an attachment comprising, a detachable drive mechanism including a power unit for controlling the movement of said deck structure, a pair of horizontally spaced upwardly extending bent tubular arms attached at their ends to said tubular members adjacent their ends, a pair of vertically disposed brackets extending between said tubular members and said tubular arms and having means for attachment thereto, and a mounting plate for said power unit extending between the brackets in a vertical plane including one of said tubular arms and secured to said brackets and in engagement with said one tubular arm.

10. In a bowling pin setter having a deck structure provided with pin receiving and setting means thereon, a supporting structure including a pair of horizontally spaced tubular members extending laterally of the alley bed, means on said members for guiding the deck structure for vertical up and down movements, and means for counterbalancing said deck structure including a pair of pivotally supported arms having their outer ends connected to said deck structure by a pair of rods, an attachment comprising, a detachable drive mechanism including a power unit for controlling the movement of said deck structure having a crank and a connecting rod extending upwardly therefrom, a pair of horizontally spaced upwardly extending bent tubular arms attached at their ends to said tubular members adjacent their ends, a pair of vertically disposed brackets extending between said tubular members and said tubular arms and having means for attachment thereto, a mounting plate for said power unit extending between the brackets in a vertical plane including one of said tubular arms and secured to said brackets and in engagement with said one tubular arm and a pair of downwardly diverging connecting arms having their upper ends pivotally connected together and to the upper end of the connecting rod and their lower ends detachably connected to said pivotally supported arms.

11. In a bowling pinsetter having a deck structure provided with a pin receiving and setting means thereon, a supporting structure therefor including means for guiding the deck structure for vertical lowering and return movements, and a pair of pivotally supported arms geared together at their pivots and having their free ends extending divergently and connected to said deck structure by links, in combination, a rotatably mounted crank positioned above the pivots for the arms, means for driving said crank, and means for connecting said crank to said arms comprising a vertically extending connecting rod having its lower end pivotally connected to a pin on said crank and a pair of downwardly diverging links connecting the upper end of said rod to said arms, said upper end of the connecting rod being in line with said crank and the pivots for said arms.

References Cited in the file of this patent

UNITED STATES PATENTS

| Number | Name | Date |
| --- | --- | --- |
| 1,294,959 | Seymour | Feb. 18, 1919 |
| 1,584,030 | Gray | May 11, 1926 |
| 1,615,064 | Bishop | Jan. 18, 1927 |
| 2,015,428 | Hedenskoog | Sept. 24, 1935 |
| 2,229,852 | Kaufman | Jan. 28, 1941 |
| 2,250,503 | Rundell | July 29, 1941 |
| 2,284,208 | Hedenskoog | May 26, 1942 |
| 2,307,839 | Kaufman | Jan. 12, 1943 |
| 2,450,249 | Murphy | Sept. 28, 1948 |
| 2,475,432 | Marihart | July 5, 1949 |
| 2,530,385 | Frye | Nov. 21, 1950 |